United States Patent [19]

Christian

[11] Patent Number: 4,883,280
[45] Date of Patent: Nov. 28, 1989

[54] TOWBAR AND COME-ALONG FOR LIGHT AIRCRAFT

[76] Inventor: Fredrick W. Christian, 10317 Havenhurst, Granada Hills, Calif. 91344

[21] Appl. No.: 207,220

[22] Filed: Jun. 16, 1988

[51] Int. Cl.[4] ............................................. B64F 1/04
[52] U.S. Cl. ................................. 280/3; 180/904; 244/50
[58] Field of Search .................. 280/3; 180/904; 254/113, 116, 94; 244/50; 188/4 R

[56] References Cited

U.S. PATENT DOCUMENTS

| | | | |
|---|---|---|---|
| 651,297 | 6/1900 | Cashen | 188/4 R |
| 2,994,541 | 8/1961 | Dobbins | 280/3 |
| 3,049,253 | 8/1962 | Cabral | 180/904 X |
| 4,470,564 | 9/1984 | Johnson | 280/3 X |
| 4,589,509 | 5/1986 | Chase | 180/74 |

Primary Examiner—Mitchell J. Hill
Attorney, Agent, or Firm—William H. Maxwell

[57] ABSTRACT

A towbar and come-along, especially for light aircraft, wherein a tongue is releasably attached to the axle of a nose wheel and carries a ratchet engageable with the periphery of the tire which is torqued by manipulation of a radially extended handle, acting as a second class lever which is adjustable and reversible and with anti-roll functions.

10 Claims, 3 Drawing Sheets

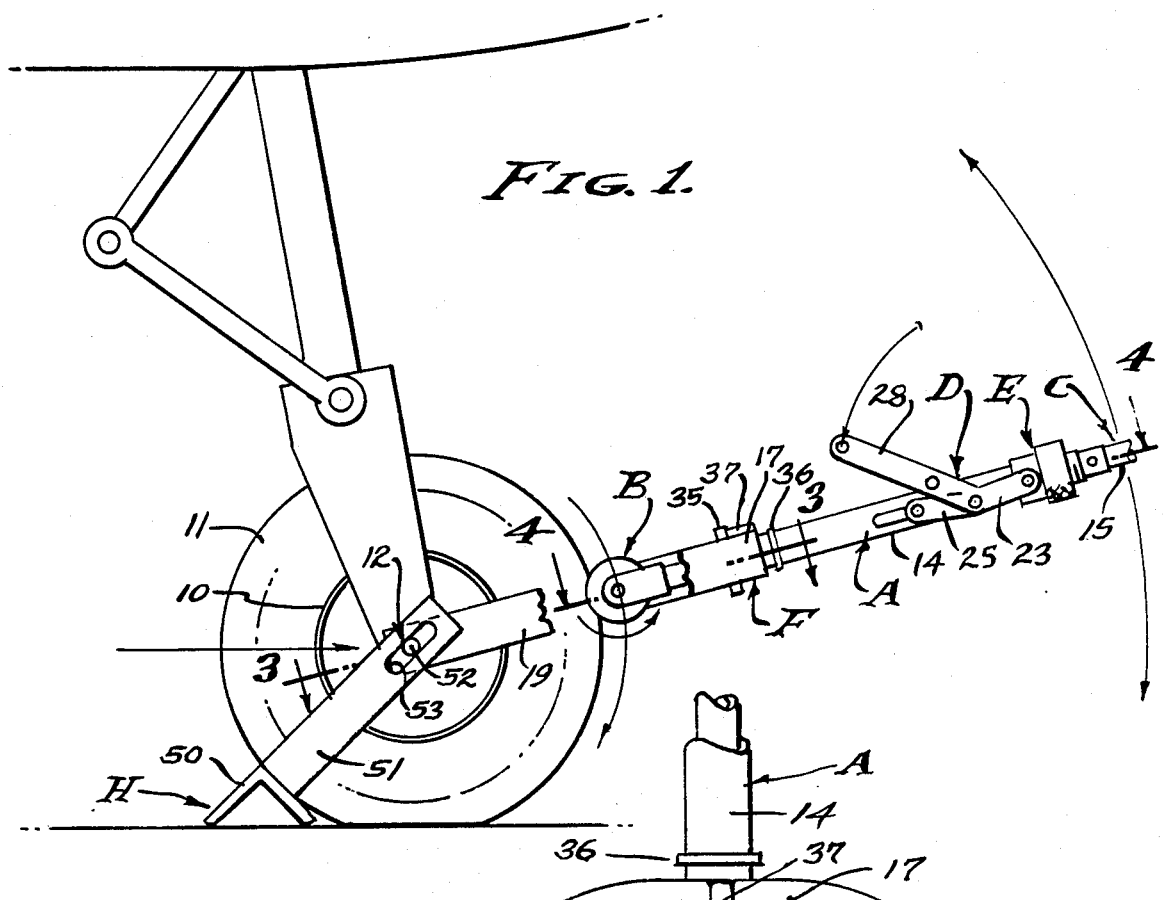
FIG. 1.
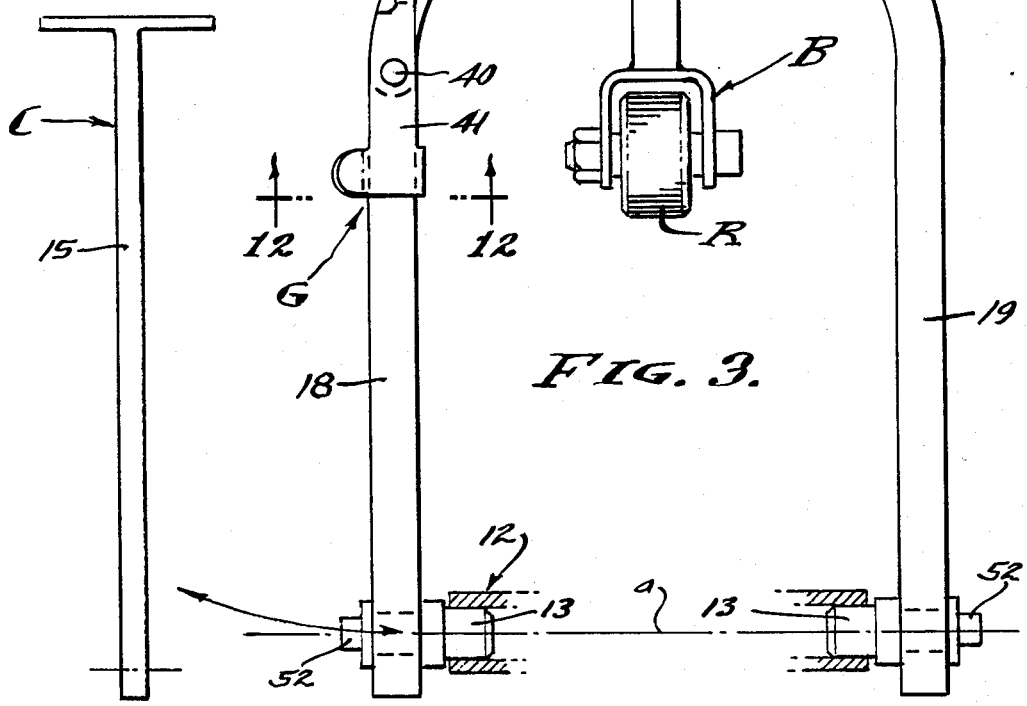
FIG. 2.
FIG. 3.

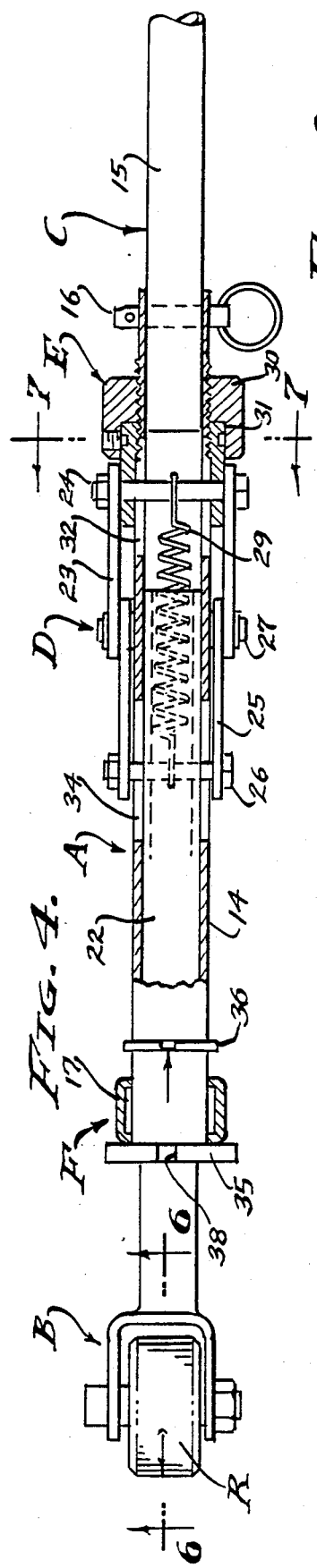
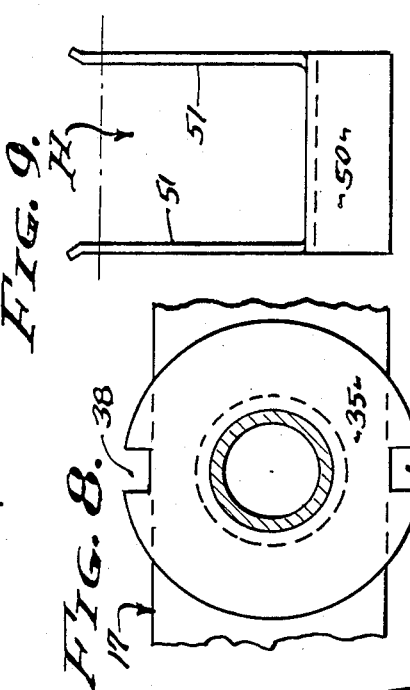
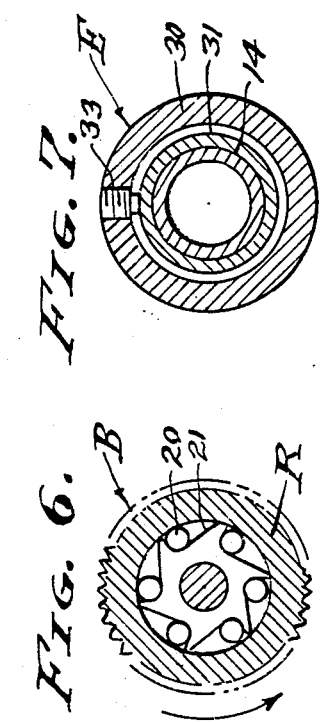
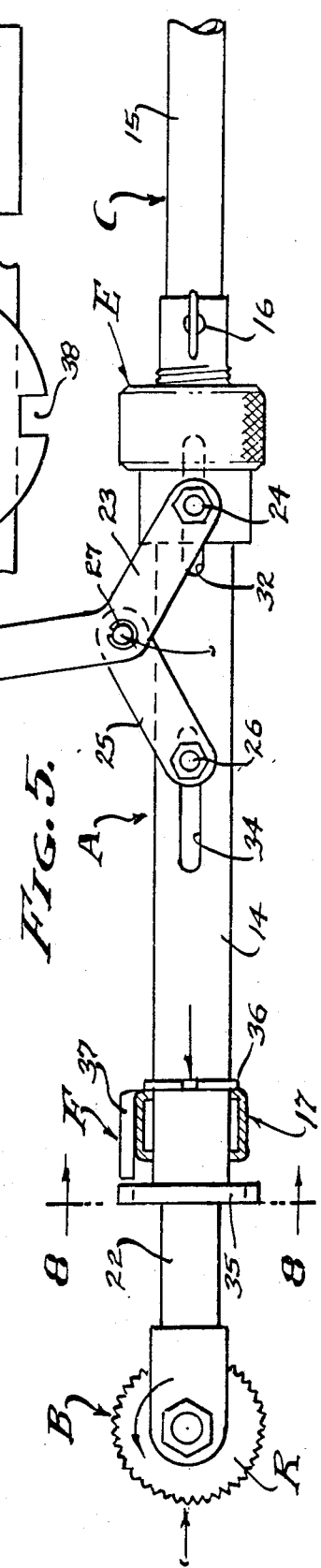

TOWBAR AND COME-ALONG FOR LIGHT AIRCRAFT

BACKGROUND OF THE INVENTION

This invention has to do with the ground handling of light aircraft, whereby a person can maneuver an aircraft over pavement or ground terrain and their normal obstructions. Ground handling of light aircraft by a pilot, or any single person, is quite necessary in order to move the plane without operating its engine. For example, the aircraft might be moved about a parking area or within a hanger space, or for the purpose of servicing. There is a wide variety of landing gear configurations, the most common of which is the tricycle landing gear having right and left main struts and a fowardly placed and centered nose strut. The main struts are equiped with larger diameter wheels, while the nose strut is equiped with a smaller diameter wheel, and all of which are fitted with pneumatic tires. And, the main gear wheels are disposed on fixed transverse axes, while the nose wheel is steerable on a centered axis. It is a general object of this invention to provide a towbar come-along combination to enable a single person to maneuver light aircraft over pavement or ground terrain and their normal obstructions. That is, to enable the person to move the aircraft over rises and out of depressions, including chuckholes, rocks, pipes or hoses, etc..

Heretofore, simple towbars have been provided for attachment to the wheels of aircraft, whereby the craft can be pulled or pushed by a person. And, for larger aircraft such devices have been motorized with either ground engaging drive wheels or with tire engaging drive rollers. The simple towbar is often inadequate and the motorized devices are too expensive and too cumbersome. And, in light aircraft there is no room or weight permissibility to carry cumbersome and heavy equipment. Accordingly, it is an object of this invention to provide a light and portable towbar come-along that can be conveniently carried aboard light aircraft.

Prior art motorized towing machines drive the aircraft nose wheel by means of a drive roller engaging the tire, and with a handle extended for steering. Such machines have been provided with motors or engines, to apply torque to the nose wheel. It is an object of this invention to apply torque to an aircraft wheel without the use of motors or engines, by means of a lever system whereby the towbar is a come-along having leverage to apply torque to said aircraft nose wheel and/or tire.

The towbar lends itself to use as a lever, it being an object of this invention to implement this potential by providing ratchet means to torque the aircraft wheel, preferably the nose wheel, either directly or indirectly. In FIGS. 10 and 11 the ratchet means is a lever combination that diretly torques the nose wheel.

In FIGS. 1 through 9, the preferred form, the ratchet means is a lever in combination with an over-riding roller that indirectly torques the nose wheel. In either form the nose wheel is torqued by a lever system involving the towbar.

It is an object of this invention to provide ratchet positioning means by which the ratchet means is put into pressured engagement with the nose wheel tire in order to torque the same. In the FIG. 10 and 11 embodiment this pressure is applied through a second class lever, as will be described. In the FIG. 1 through 9 embodiment this pressure is applied through a toggle means, as will be described.

It is another object of this invention to provide adjustability so as to accomodate different diameter wheels and variations in tire inflation. In the FIG. 10 and 11 embodiment there are adjustment holes for selective positioning of the second class lever fulcrum. In the FIG. 1 through 9 embodiment there is a screw adjustment to position the toggle means that depresses the over-riding roller into the tire.

It is still another object of this invention to provide reversibility of torque application to the aircraft wheel and/or tire. In the FIG. 10 and 11 embodiment the towbar come-along unit is simply turned over; being shown in a forward drive position in the drawings. In the FIG. 1 through 9 embodiment the handle lever is rotated 180° (see FIGS. 5 and 8); being shown in a forward drive position throughout the drawings.

A feature of this invention is the rigidity of the lever system and its application and removability to the nose wheel of the aircraft. Aircraft axles vary in design, most of which are tubular as shown herein. However, some aircraft axles present closed ends with nuts, for example, in which case adaptation thereto is by means of sockets rather by the trunions shown herein. The attachment portion of the lever as shown herein is of fork configuration, at least one leg of which is moveable as shown in the FIG. 1 through 9 embodiment, and both of which are flexible in the FIG. 10 and 11 embodiment.

Still another object of this invention is the provision of a nose wheel chock in combination with the towbar come-along, whereby movement in the opposite direction of travel, forward or backward, is precluded.

SUMMARY OF THE INVENTION

This invention relates to the ground handling of light aircraft, whereby a single person can easily maneuver the craft over the ground and normal obstructions. The towbar come-along as it is disclosed herein is characterized by a second class lever that torques the aircraft wheel through ratchet means engageable with the tire. The fulcrum of the second class lever is preferably the axle of the wheel, the handle of the towbar being raised and lowered, depending upon the desired direction of travel, in order to actively engage the tire for the application of torque. In the FIG. 10 and 11 embodiment the ratchet means involves a first class lever in which the towbar handle is manipulated. In the FIG. 1 through 9 embodiment the ratchet means involves an over-riding roller that is moved by the towbar handle. In both embodiments, the ratchet means is adjustable as well as reversible. And, the towbar come-along is removeably attached to the nose wheel axle, with chock means applied as circumstances require to preclude reverse rolling of the aircraft.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a side elevation of a typical nose wheel strut, with the towbar come-along in an operative position, and with the chock in place.

FIG. 2 is a view of the towbar handle extension.

FIG. 3 is an enlarged view taken as indicated by line 3—3 on FIG. 1.

FIG. 4 is an enlarged view, partially in section, taken as indicated by line 4—4 on FIG. 1.

FIG. 5 is an enlarged view of a portion of FIG. 1, showing the ratchet means retracted.

FIG. 6 is an enlarged detailed sectional view taken as indicated by line 6—6 on FIG. 4.

FIG. 7 is an enlarged detailed sectional view taken as indicated by line 7—7 on FIG. 4.

FIG. 8 is an enlarged detailed sectional view taken as indicated by line 8—8 on FIG. 5.

FIG. 9 is a plan view of the chock means removed from the aircraft axle.

Figure 12:
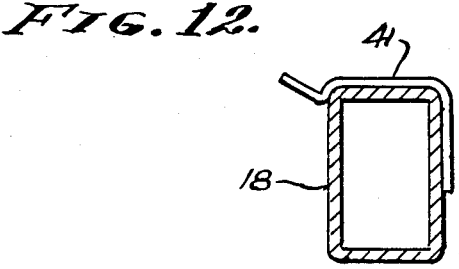

And, FIG. 12 is an enlarged detailed sectional view taken as indicated by line 12—12 on FIG. 3.

PREFERRED EMBODIMENT

Figure 10:
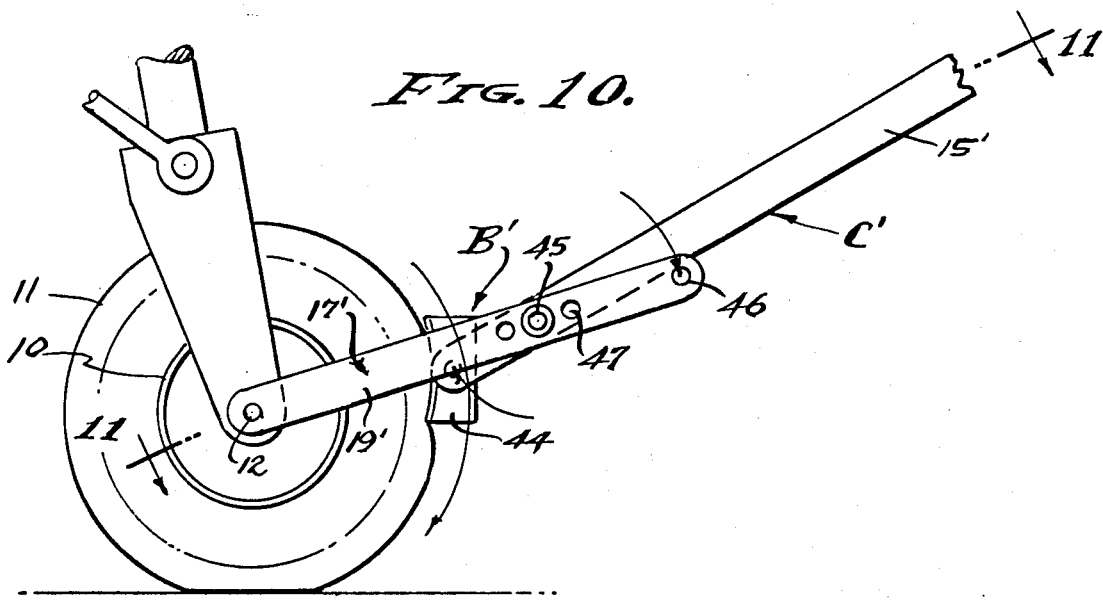
FIGS. 10 and 11 are views of a basic second embodiment, FIG. 10 being similar to FIG. 1, and FIG. 11 being taken as indicated by line 11—11 on FIG. 10.
Figure 11:
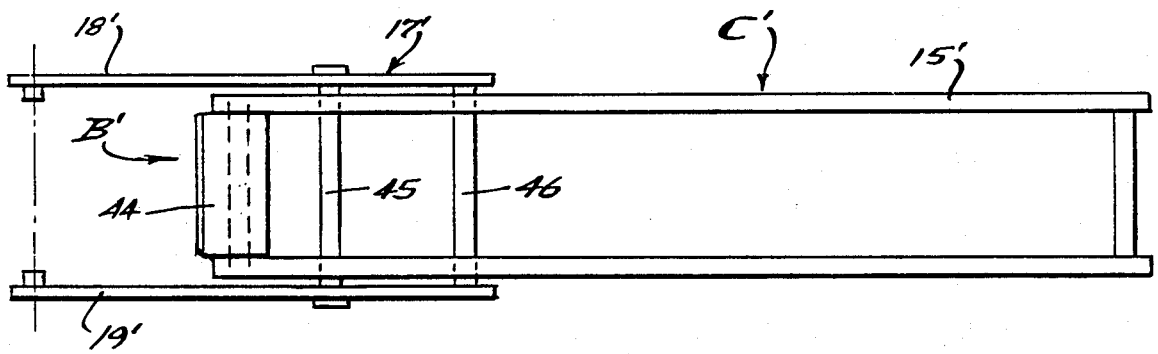

Referring now to the drawings, FIGS. 1 through 9 illustrate the preferred embodiment, while FIGS. 10 and 11 illustrate a simplified embodiment. In each embodiment there is a lever means A that engages the aircraft wheel 10 through a ratchet means B, and all of which is combined with a towbar C that provides a handle for manipulation. The lever means A is a second class lever in which the resistance to torque the aircraft wheel is between the fulcrum and the opposite force end of the lever. As shown, the fulcrum is at or preferably coincidental with the rotational axis of the aircraft wheel, and engagement with the wheel is by the ratchet means B with the periphery of the tire 11. As shown in FIG. 3 the axle 12 has tubular end portions providing for reception of trunion means 13 on the axis of rotation.

The towbar C is comprised of a tongue 14 that extends radially from axis a of wheel rotation, to a lever or handle 15 (see FIG. 2) that is replaceable on the tongue 14 by means of a release pin 16 as shown in FIG. 4. In the FIG. 1 through 9 embodiment the tongue 14 and handle 15 is a rigid assembly forming a second class lever that carries the ratchet means B to engage and apply torque to the wheel 10. There are towbars wherein a single legged tongue extends from one end of the axle 12 and along one side of the wheel 10 and tire 11, however it is preferred that the tongue 14 be in the form of a fork 17 having two legs 18 and 19 that embrace the wheel and tire, and with trunions 13 engaged in the opposite tubular ends of the axle 12. Accordingly, the trunnions 13 provide fulcrum means at the rotational axis a of the wheel 10, and the lever or handle 15 extends rigidly and radially therefrom.

In accordance with this invention, the ratchet means B is provided to engage and torque the tire 11 of the wheel 10 in one direction of rotation, as may be required. As shown in the drawings, this is in a forward direction, but which is reversible when desired. In the FIG. 1 through 9 embodiment the ratchet means B is an over-riding roller R wherein clutch members 20 operate in circumferentially inclined recesses 21, so as to drive the roller R in the one direction of rotation as is indicated by the arrows in FIGS. 1,5 and 6. The roller R is carried by the tongue 14 to engage the tread or periphery of the tire 11, and is knurled or serrated to have substantial frictional engagement therewith.

I accordance with this invention, the ratchet means B is placed into pressured engagement with the tire 11 by positioning means D. In the FIG. 1 through 9 embodiment means D is a toggle means that retractably applies the ratchet means B to the tire 11. Application of the ratchet means B to the tire 11 is shown in FIGS. 1, 3 and 4, while retraction therefrom is shown in FIG. 5. The toggle means is carried by the tongue 14 in which a slide 22 reciprocates to move the roller R into and out of pressured engagement with the tread of the tire 11. In practice, the tongue 14 projects from the fork 17 and is tubular and within which the tubular slide reciprocates. The toggle means involves a link 23 anchored to the tongue 14 by a pivot pin 24, and a link 25 is coupled to the slide 22 by a pivot pin 26. The links 23 and 25 are interconnected by a coupling pin 27, and one of said links and preferably the anchored link 23 includes a lever of bellcrank form 28 for its manipulation from a retracted position as shown in FIG. 5 to a protracted position as shown in FIGS. 1 and 4. In practice, the links 23 and 25 are in pairs at the two sides of the toggle system (see FIG. 4). A tension spring 29 between pins 24 and 26 returns the toggle system to the retracted position. The toggle system is in an over-center locked condition as shown in FIGS. 1 and 4, from which it is easily released.

In accordance with this invention, the ratchet means is placed into the desired pressured engagement with the tread of the tire 11 by an adjustment means E. The means E is illustrated in FIGS. 4 and 7, and is shown as a nut 30 threadedly engaged over the tubular tongue 14 to selectively position an anchor collar 31 that carries the anchor pin 24 through guide slots 32 in the tongue. One member is annularly grooved to receive a dog-pointed screw 33 that positions and secures the collar.

In accordance with this invention, the rotational effect of the ratchet means B is reversed by control means F. The means F reverses the torque effect by turning the roller R from side to side 180°. As shown, the slide 22 is rotatably coupled to the tongue 14 by the anchor pin 24, and also by the pin 26 operable in slots 32 and 34. Consequently, the roller R can be rotated from side to side by turning of the tongue 14, the tongue being rotatably attached to the fork 17 with freedom to have limited reciprocal motion with respect to axis a. A control flange 35 forms a stop engageable with the inside of the fork 17, and a shoulder 36 formed by a snap ring forms a stop engageable with the outside of the fork 17 (compare FIGS. 4 and 5). A positioning lug 37 provided on one member, and preferably the fork 17 to selectively engage in either one of two diametrically opposite notches 38 in the periphery of the flange 35, in order to position and hold the tongue rotatably oriented as circumstances require.

Attachment to the aircraft axle 12 is by engagement of the trunions 13, or the like, with the ends of the axle. And, detachment is by disengagement thereof. Disengagement means G is shown in the form of one leg 18 pivoted at 40 and adapted to swing away from the axle 12 (see FIG. 3). A releasable spring tab 41 embraces the fork leg 18 to hold it in operating position, as is shown.

Referring now to the simplified FIG. 10 and 11 embodiment, the wheel 10 and second class lever arrangement of the towbar C' as related to the ratchet means B' is the same as hereinabove described. However, the handle 15' is part of the ratchet means. The fork 17' is comprised of laterally flexible legs 18' and 19', which permit separation of the legs to perform the function of the disengagement means. The ratchet means B' involves a friction block 44 that directly engages the tread of tire 11 when forced thereagainst by the first class lever of the handle 15' in which the resistance to torque to aircraft wheel is at the block 44 and the fulcrum pin 45 is between said block and the opposite force end of the lever. A feature of this embodiment is the engagement of fork 17' with handle 15' by means of a stop lug 46 outward of the fulcrum pin 45, so that handle 15' has limited motion with respect to fork 17' so as to angularly displace the same as is indicated in FIG. 10. Pressure adjustment is by selective placement of the fulcrum pin 45 in any pair of a series of aligned holes 47 spaced along legs 18' and 19'. And, reversibility is simply by means of turning the entire assembly over, so as to apply torque in the opposite ratational direction.

Anti roll means H is provided in the form of a transverse ground supported bar 50 against which the tire 11 will roll to a stop. At least one and preferably a pair of side arms 51 extend radially to axis a, where they engage over the trunion fastener heads 52, having slotted engagement 53 to accomodate variations in tire diameter and ground support imperfections. The arms 51 are resilient so as to be disengageable from the the axle.

From the foregoing it will be apparent that I have provided a simple and light weigth device that can transported aboard light aircraft, and which facilitiates ground handling thereof by a single person.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A towbar and come-along for ground handling light aircraft and the like having a ground engaging wheel free to rotate on an axle axis, and including;
   a tongue extending on a radius from
   the axle axis of the wheel,
   trunnion means
   mounted on said tongue and pivotally attaching the tongue to the wheel axle for manipulation to tow the aircraft,
   a slide carried by and rotatable with the tongue,
   and ratchet means mounted on an end of the slide and engageable with a periphery of the wheel to rotate the wheel in one direction and rotatable 180° with the tongue to reverse the ratchet means and rotate the wheel in the other direction,
   the tongue and ratchet means cooperatively forming a second class lever having its fulcrum at the axle axis of the wheel and resistance to torque at the periphery of the wheel when manual force is applied to rotate the tongue about said axle axis of the wheel.

2. The towbar and come-along as set forth in claim 1, wherein the wheel has a depressible tire and wherein means pressures the ratchet means into pressured engagement with the tire.

3. The towbar and come-along as set forth in claim 1, wherein the ratchet means comprises an over-riding roller rotatable in one direction only and rotatably carried by the slide on the tongue and engaging the periphery of the wheel to rotate the same in said one and said other direction.

4. The towbar and come-along as set forth in claim 3, wherein adjustment means positions the ratchet means into pressured engagement with the periphery of the wheel.

5. The towbar and come-along as set forth in claim 3, wherein the wheel has a depressible tire, and wherein adjustment means positions the over-riding roller of the ratchet means into depressed pressured engagement with the periphery of the tire.

6. The towbar and come-along as set forth in claim 3, wherein a positioning means comprises a manually releasable over center toggle operable between the tongue and the slide and positions the ratchet means into pressurized engagement with the periphery of the wheel.

7. The towbar and come-along as set forth in claim 3, wherein the wheel has a depressible tire, and wherein a positioning means comprises a manually releasable over center toggle operable between the tongue and the slide and positions the over-riding roller of the ratchet means into depressed pressured engagement with the periphery of the tire.

8. The towbar and come-along as set forth in claim to 3, wherein the tongue includes a flange with diametrically opposite notches selectively engageable with a lug that is carried by the trunnion means to rotatably position the over-riding roller.

9. The towbar and come-along as set forth in claim 3, wherein the tongue is reciprocally carried in
   the trunnion means and includes a shoulder and a flange spaced for limited movement of said tongue, the flange having diametrically opposite notches selectively engageable with a lug that is carried by the trunnion means to rotatably position the over-riding roller.

10. The towbar and come-along as set forth in claim 1, wherein anti roll means comprises a chock having arms engageable between the wheel axis and a supporting surface, said arms having slot means for engagement with said wheel axle and slidably extending radially from the wheel axle to adjust to the wheel and supporting surface and prevent movement in a direction opposite to torque applied by the ratchet means.

* * * * *